July 11, 1967
F. U. STEWART
3,330,671
FROZEN BREAD PACKAGE
Filed Sept. 10, 1962
2 Sheets-Sheet 1
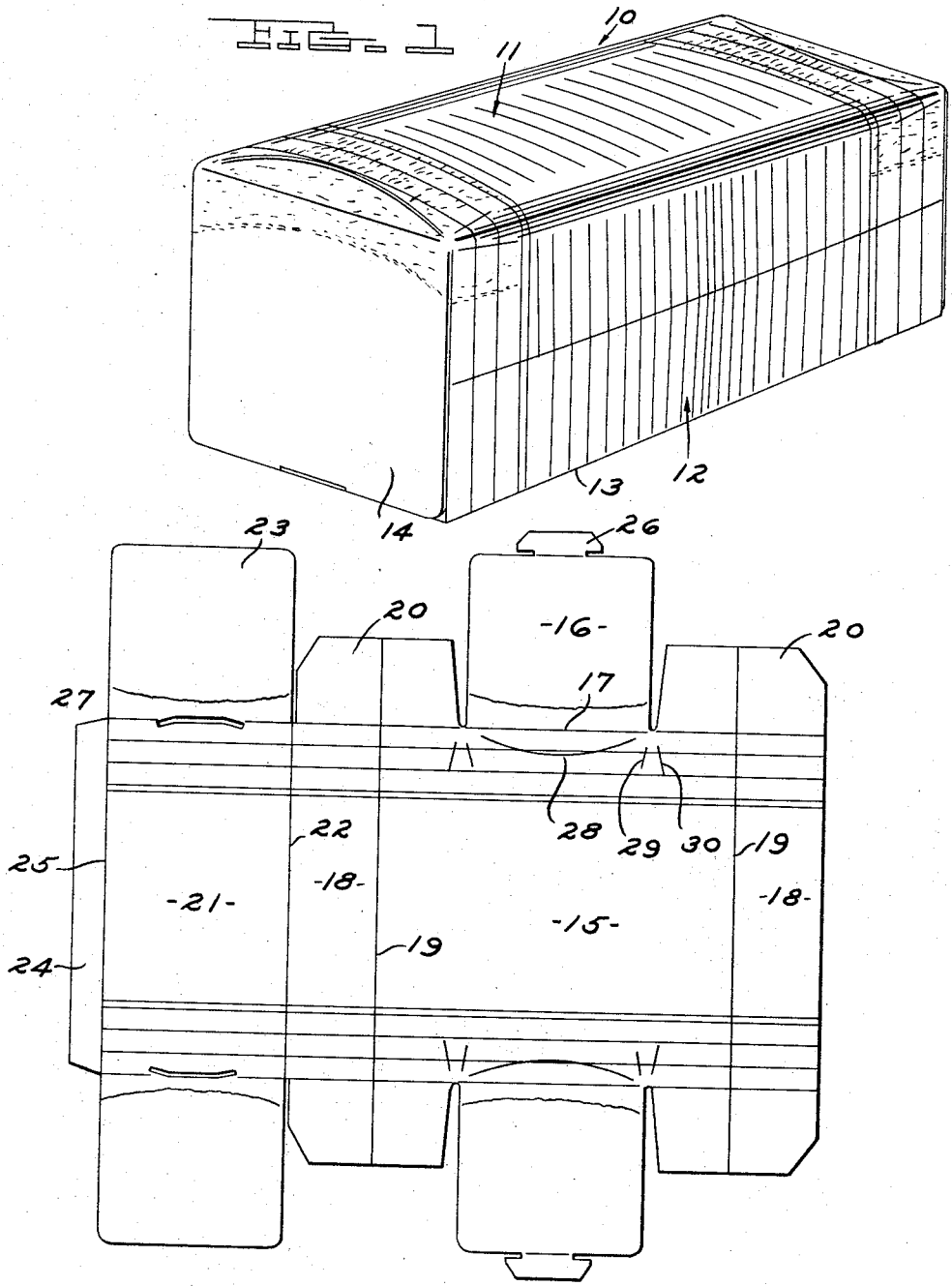
INVENTOR.
FLORENTINE URBAN STEWART
BY
Barnes, Kisselle, Raisch & Choate
ATTORNEYS

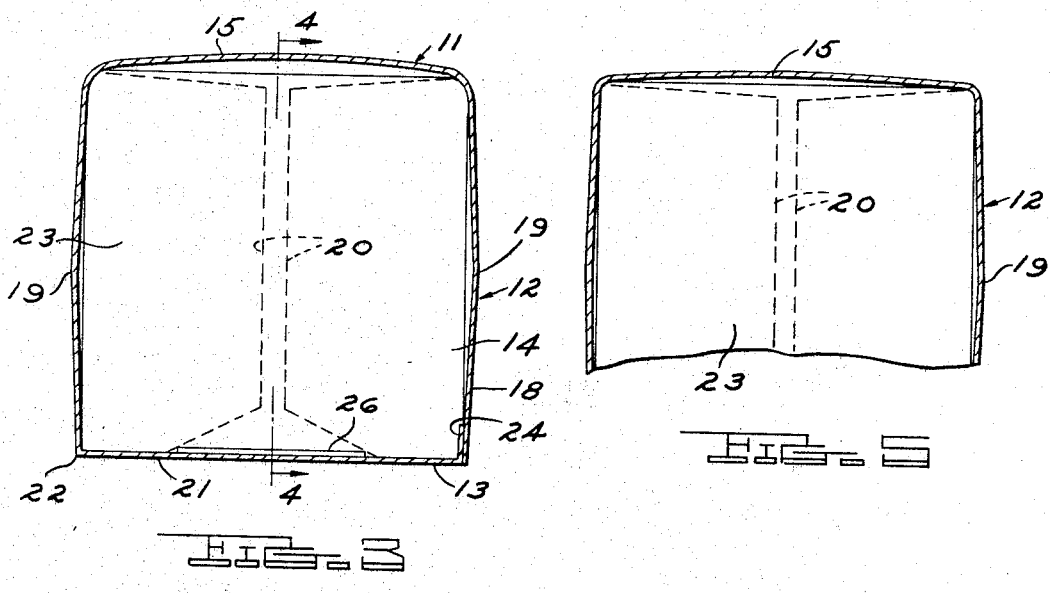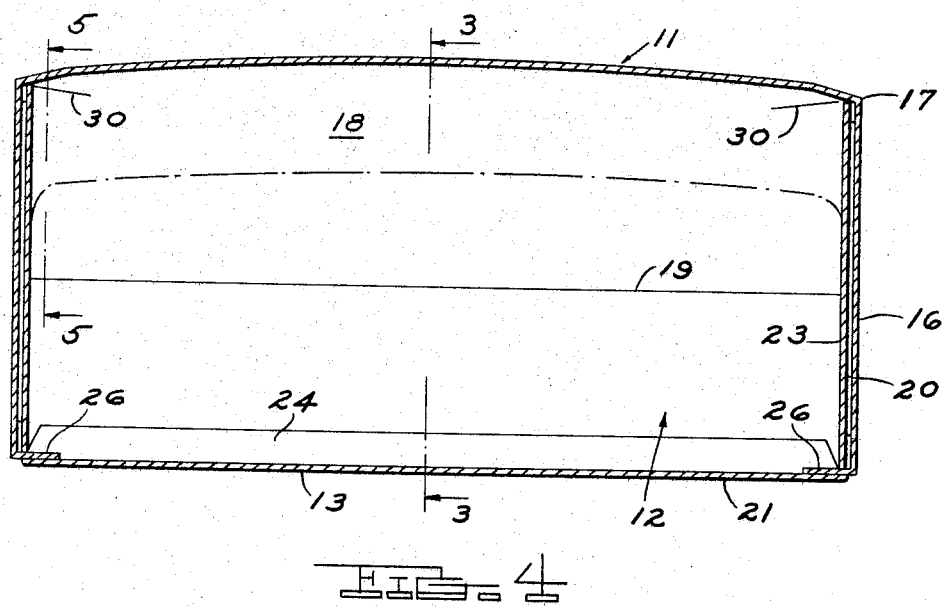

United States Patent Office 3,330,671
Patented July 11, 1967

3,330,671
FROZEN BREAD PACKAGE
Florentine Urban Stewart, Birmingham, Mich.
(23849 W. Chicago, Detroit, Mich. 48239)
Filed Sept. 10, 1962, Ser. No. 222,451
7 Claims. (Cl. 99—172)

This invention relates to frozen bread packages.

It is an object of the invention to provide a frozen bread package which will efficiently protect a frozen loaf of bread which is unbaked, partially baked, or completely baked and will also serve to readily distinguish the loaf of bread when it is displayed and stored thereby facilitating its removal from the display or storage compartment.

Basically, the invention comprises a container of semi-rigid material which is so shaped and printed as to simulate the appearance of a baked, sliced, loaf of bread; which container is made from a single piece blank that is generally tubular and can be readily assembled to form the container, as presently described.

In the drawings:

FIG. 1 is a perspective view of the frozen bread package.

FIG. 2 is a plan view of the blank used in forming the container that forms part of the frozen bread package.

FIG. 3 is a transverse sectional view taken along the line 3—3 in FIG. 4.

FIG. 4 is a longitudinal sectional view taken along the line 4—4 in FIG. 3.

FIG. 5 is a fragmentary sectional view taken along the line 5—5 in FIG. 4.

FIG. 6 is a transverse sectional view through the blank shown in FIG. 2 after it has been folded into flattened tubular form.

Referring to FIG. 1, the frozen bread package 10 is made of a container of semi-rigid material such as cardboard or plastic and encloses a frozen loaf of bread 11 which is in the unbaked, partially baked or fully baked condition, either sliced or unsliced.

The container which forms a part of the frozen bread package comprises a top wall 11, side walls 12, bottom wall 13 and end walls 14. The top and side walls are printed with transverse lines which simulate the slices of a loaf of bread. In addition, the top, side and end walls are shaded and preferably printed with brown color to simulate the browned appearance of a baked, sliced loaf of bread, ready for consumption.

The container is preferably made from a single piece blank of cardboard, which as is well known is opaque, such as shown in FIG. 2, which comprises a first generally rectangular panel 15 having end panels extending from the end edges thereof along first fold lines 17. A second panel 18 extends along each side edge of the first panel 15 and is connected thereto along a fold line 19. End flaps 20 extend from the remaining portion of the end edges of the first panel and the end edges of the second panel 18 and are connected thereto by extensions of the fold line 17. A third panel 21 is connected along one side edge of one of the second panels 18 along a fold line 22. The third panel 21 includes a central portion which defines the bottom wall 13 of the container, as presently described, and end flap portions 23 which are connected to the central portion along extensions of the fold line 17. An attaching flap 24 is connected to the other side edge of the third panel 21 along a fold line 25.

As shown in FIGS. 4 and 6, when the attaching flap 24 is fastened to the underside of the panel 18, as by gluing, the resultant blank can be folded along the fold lines 19 to produce a tubular blank. This blank can be expanded when desired by folding along fold lines 22 to define the bottom wall 13. The side walls 12 are then defined by the second panels 18 and portions of the first panel 15. The top wall 11 thereby assumes a curved configuration and is connected to the side wall portions at the area of juncture by a curve rather than an abrupt fold line.

When the carton is assembled with the frozen loaf of bread in the container, the flaps 20 are first folded inwardly along fold line 17 over the panels 23 and then finally the panels 16 are folded downwardly over the flaps 20 and panels 23 to define the end walls 14. Lock tabs 26 on end panels 16 extend into corresponding slots 27 which are provided at the area of juncture of the central portion of the panel 21 and the end flap portions 23.

To further provide the simulation of a loaf of bread and facilitate the curving of the surfaces at the upper part of the container, score lines are provided adjacent the end edges of the panel 15. Specifically, a concave outwardly curved score line 18 is provided adjacent each side edge of the panel 15 opposite the end panel 16 and converging score lines 29, 30 are provided on opposite sides of the area of juncture between the central portion of the panel 15 and the side portions which define part of the side wall. When the container is expanded, these portions provide a longitudinal curvature to the container as shown in FIGS. 1 and 4.

It can thus be seen that there has been provided a frozen bread package which not only effectively protects the frozen loaf of bread but, if the frozen bread is sliced, it is maintained in such assembled condition; in addition, the package provides an accurate simulation of the loaf as it will be after it has been removed and heated so that the package can be readily identified by a purchaser in a frozen storage compartment. In other words my frozen food package reproduces accurately in size, shape and appearance the loaf of bread that will eventually be obtained from the frozen contents thereof.

I claim:

1. A frozen bread package comprising
   a container of semi-rigid material having the general shape of a baked loaf of bread,
   and a frozen loaf of bread in said container,
   said container being made from a single piece blank comprising a first generally rectangular panel,
   end panels extending from the end edges of said first panel generally centrally thereof,
   a second panel connected to each side edge of said first panel along a second fold line,
   end flaps connected to said first and second panels on each side of said end panels along said first fold line,
   said second fold line extending through said end flaps,
   a third panel connected to one of said second panels along the other side edge thereof,
   said third panel having portions defining a second set of end panels connected to said third panel along fold lines comprising an extension of said second fold line,
   an attaching flap connected to said third panel along the other side edge thereof,
   said blank having transversely extending lines imprinted thereon extending through the first, second and third panels to simulate the lines of a sliced loaf of bread,
   said first and second panels having imprinted shading corresponding to the shading of a browned loaf of bread,
   said attaching flap being secured to said other second panel,
   the width of said first panel corresponding to the sum of the width of said second and third panels,
   whereby when said attaching flap is fixed to said other second panel and said blank is folded along said second fold lines, a flat tubular blank is formed which can be subsequently expanded so that the central portion of said first panel defines a top wall of the container, the side portions of said first panel and said second panels defining the side walls of the container, the third panel defines the bottom wall of the container and the first and second set of end panels and said end flaps define the end walls of a container.

2. The combination set forth in claim 1 where in said first panel has portions thereof scored to define the longitudinally curved ends of a baked loaf of bread.

3. The combination set forth in claim 2 wherein said score lines comprise a first score line which is curved concavely outwardly.

4. The combination set forth in claim 3 wherein said score lines include converging score lines in said central panel on either side of the area of juncture of the top and side wall defining portions of the first panel.

5. The combination set forth in claim 1 including lock flaps on said first end panels and complementary slots on said third panel.

6. The combination set forth in claim 5 wherein said slots are at the area of juncture of the bottom and end panel portions of said third panel.

7. A frozen bread package comprising a container of semi-rigid material having the general shape of a baked loaf of bread, and a frozen loaf of bread in said container, said container having a top wall, opposed side walls, a bottom wall and opposed end walls, the top wall of said container being curved upwardly to simulate the transverse curvature of the loaf of bread, the areas of juncture of said top and side walls being curved to simulate the upper corners of the loaf of bread, the top and side walls being formed with transverse lines simulating the slices of a sliced loaf of bread, the top and side walls being imprinted with shading comparable to the browned shading of a baked loaf of bread whereby the appearance of the container resembles that of a baked loaf of bread, said container being made from a tubular blank which when expanded defines the top, opposed side, bottom and end walls.

References Cited

UNITED STATES PATENTS

| | | | |
|---|---|---|---|
| 1,896,602 | 2/1933 | Andrews | 99—173 X |
| 2,048,213 | 7/1936 | Grogan | 99—172 |
| 2,324,137 | 7/1943 | Cunningham | 53—6 |
| 2,695,645 | 11/1954 | Tupper | 99—173 X |

OTHER REFERENCES

Essipoff: "Making the Most of Your Food Freezer," Rinehart and Co., Inc., New York, 1954, page 242.

RAYMOND N. JONES, *Primary Examiner.*

ABRAHAM H. WINKELSTEIN, A. LOUIS MONACELL, *Examiners.*